United States Patent [19]

Goudarzi et al.

[11] 4,455,929
[45] Jun. 26, 1984

[54] APPARATUS FOR LONGITUDINAL SECTIONING OF STEM TYPE VEGETABLES

[76] Inventors: Khosrow Goudarzi, 304 Peckham Rd.; Fernando I. Maltos, 231A Live Oak Rd., both of Watsonville, Calif. 95076

[21] Appl. No.: 429,801

[22] Filed: Sep. 30, 1982

[51] Int. Cl.³ .......................................... A23N 15/02
[52] U.S. Cl. ........................................ 99/637; 83/155; 83/409; 83/431; 99/537; 99/643; 198/628; 198/844
[58] Field of Search .................. 99/537, 538, 567, 574, 99/576, 588–593, 635–643; 83/409, 409.1, 431, 155; 198/628, 844

[56] References Cited

U.S. PATENT DOCUMENTS

| | | | |
|---|---|---|---|
| 1,568,594 | 1/1926 | Flint. | |
| 1,890,676 | 12/1932 | Fox. | |
| 2,344,711 | 3/1944 | McNutt et al. | 99/576 |
| 3,429,420 | 2/1969 | Bechthloff et al. | |
| 3,511,122 | 5/1970 | Sherrill et al. | 83/155 |
| 3,688,828 | 9/1972 | Peterson. | |
| 4,094,238 | 6/1978 | Striplin | 99/643 |
| 4,183,294 | 1/1980 | Williams et al. | 99/537 |
| 4,321,865 | 3/1982 | Ramseier | 99/576 |

*Primary Examiner*—Timothy F. Simone
*Attorney, Agent, or Firm*—Robert W. Dilts

[57] ABSTRACT

Apparatus for trimming and slicing stem-type vegetables such as broccoli and the like. The apparatus is specifically adapted to slice the stem-type vegetable stalk into longitudinal sections and includes a pair of mutually opposed resilient close spaced surfaces on opposite sides of a first plane. Each of the surfaces is divided into two closely spaced parts on opposite sides of the second plane normal to the first plane. The resilient surface parts may comprise polyurethane foam surfaces on conveyor belts or conveyor pulleys which are moved synchronously with respect to each other in order to carry the vegetable stalk along a given path. A knife is mounted in the path of movement of the vegetable stalk with its knife edge forming its leading edge with respect to the vegetable stalk in order to slice it longitudinally. The knife may have two or more blades and the vegetable stalk is preferably gripped by the resilient surfaces throughout its length during the cutting process. The resilient surfaces are relieved to accomodate and center the trunk portion of the vegetable stalk and the gripping of the vegetable stalk from four sides by the resilient surfaces results in minimum breakage of the branch portion of the vegetable stalk. Apparatus is also disclosed for gripping the trunk portion of the vegetable stalk and carrying it into contact with a rotary knife in order to remove the butt end of the trunk portion.

9 Claims, 8 Drawing Figures

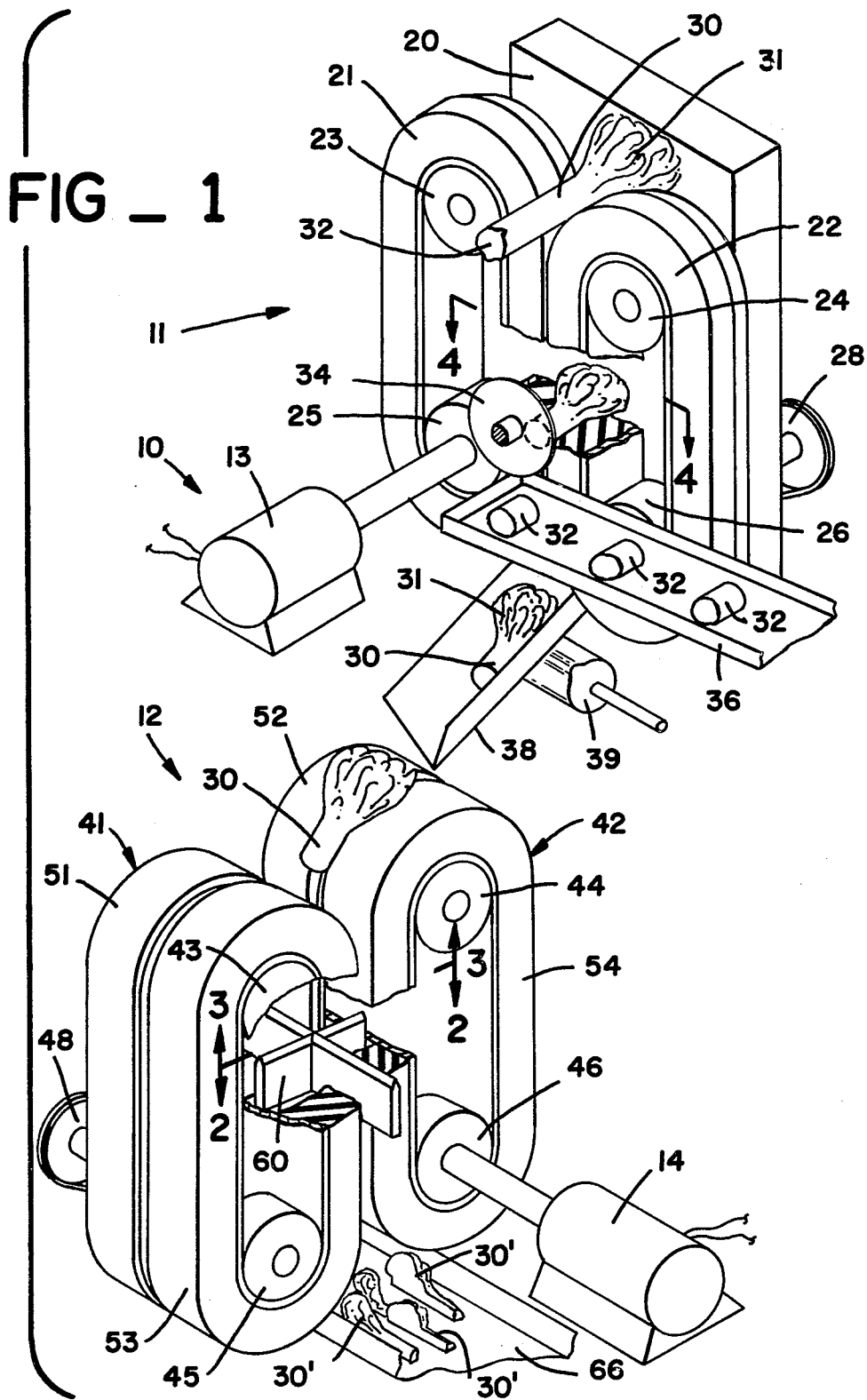
U.S. Patent    Jun. 26, 1984    Sheet 1 of 3    4,455,929
FIG_1

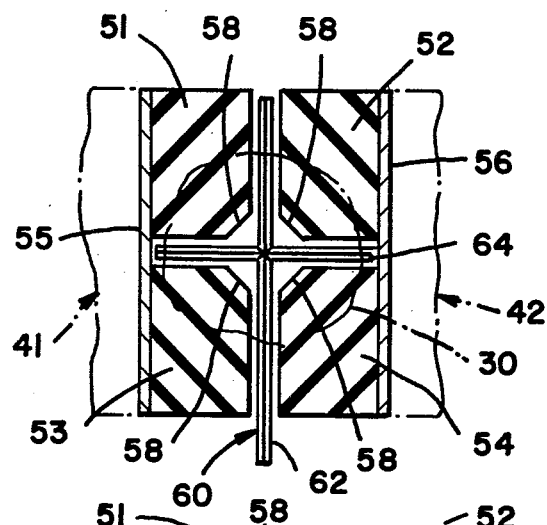
FIG _ 2
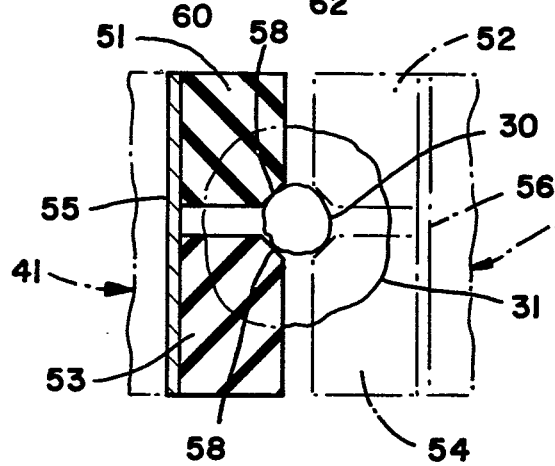
FIG _ 3
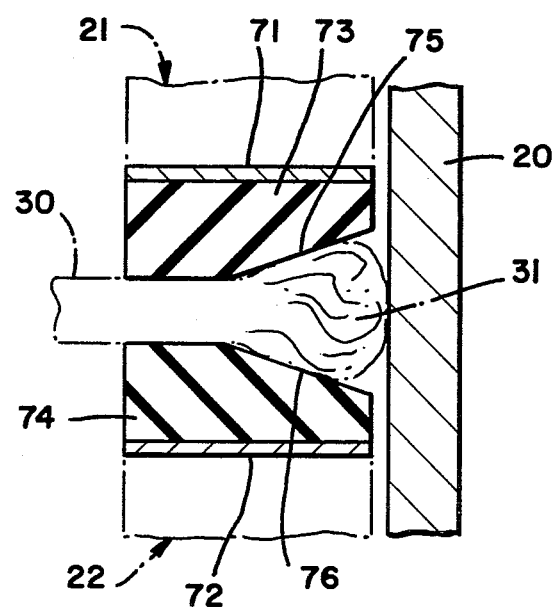
FIG _ 4

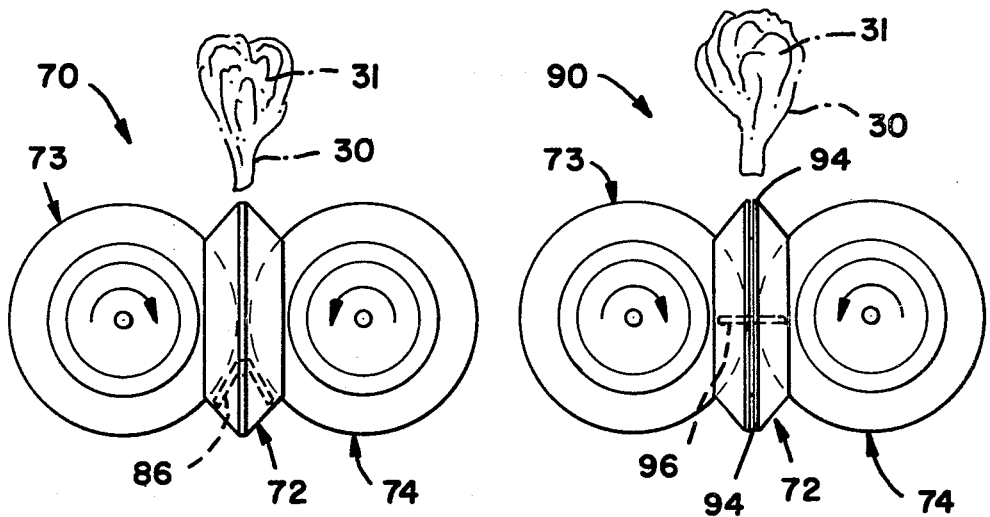
FIG _ 5   FIG _ 7
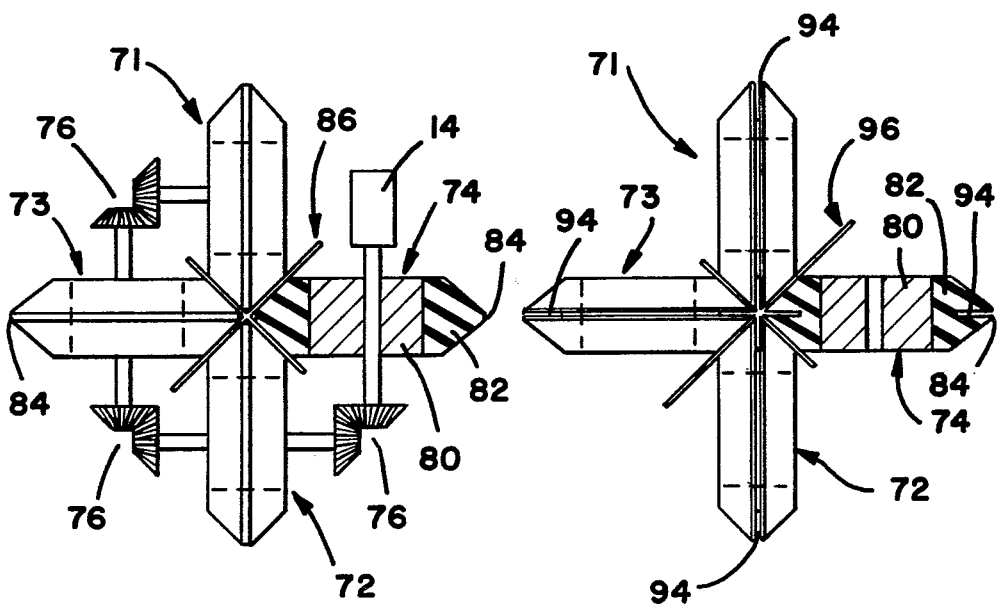
FIG _ 6   FIG _ 8

APPARATUS FOR LONGITUDINAL SECTIONING OF STEM TYPE VEGETABLES

DESCRIPTION

1. Field of the Invention

This invention relates to the trimming and cutting of vegetables and more particularly to apparatus for slicing stem type vegetables, such as broccoli and the like, into longitudinal sections.

2. Background of the Invention

In the packaging of broccoli for sale, particularly when the broccoli is to be frozen prior to sale, it is desirable to separate each broccoli stalk into longitudinal sections. Broccoli stalks each comprise a relatively heavy trunk or stem portion, which may be of various lengths, with a plurality of relatively light branches at one end thereof. The branches are usually asymmetrically disposed about and along one end of the stem and are themselves divided into smaller branches.

In the prior art, it was necessary to cut each individual broccoli stalk into longitudinal sections by hand because of the unique asymmetric conformation of the individual stalks. For example, it is customary to cut broccoli into longitudinal quarter sections each having a substantially equal number of branches thus defining sections or spears of relatively equal volume and content. According to the prior art, it was necessary for a laborer to perform the sectioning operation by hand, which is expensive and time consuming.

Machines are known in the prior act for cutting relatively solid, compact vegetables such as potatoes, and fruits such as pears into sections. For example, according to the teaching of U.S. Pat. No. 3,688,828 issued to Soren E. Petersen on Sept. 5, 1972, potatoes are gripped between a pair of spaced resilient rollers and thrust into a stationary knife to cut the potatoes into sections. The potatoes are released from the gripping action of the rollers upon contact with the knife and since they are relatively dense and non-fibrous they will tend to split easily upon initial contact with the knife. However, the teaching of Petersen would be totally inapplicable to the sectioning of broccoli due to the soft fibrous nature of the broccoli stems and the relatively fragile nature of the broccoli branches.

Similarly, according to the teaching of U.S. Pat. No. 1,890,676 issued to John L. Fox on Dec. 13, 1932, pears are gripped between a pair of spaced belts at one end and transported into a rotating knife or saw to divide them into two halves. This teaching would also be totally inapplicable to the sectioning of broccoli due to the fragile asymmetric conformation of the broccoli stem and branches.

SUMMARY OF THE INVENTION

It is the primary object of this invention to overcome the foregoing shortcomings of the prior art. The apparatus of this invention is specifically adapted for slicing stem type vegetables such as broccoli and the like into longitudinal sections and comprises a pair of mutually opposed resilient close spaced surfaces on opposite sides of a first given plane each of which is divided into two closely spaced parts on opposite sides of a second given plane normal to the first given plane. Means are provided for moving each part of the pair of mutually opposed resilient close spaced surfaces synchronously with the other parts thereof along said given planes. Means are also provided for feeding stem type vegetables stem first between the pair of surfaces for movement by such surfaces along a path coinciding with the intersection between the first and second given planes. Knife means are mounted in at least one of the first and second given planes and in the path of movement of the vegetables with the knife edge of the knife means forming the leading edge thereof with respect to the vegetables.

BRIEF DESCRIPTION OF THE DRAWING

This invention will be more fully understood from a reading of the following detailed description of preferred embodiments thereof in conjunction with the appended drawing wherein:

FIG. 1 is a perspective view of an apparatus according to one embodiment of this invention specifically adapted for slicing broccoli longitudinally into four quarters with portions broken away to illustrate the relationship of internal parts to each other and to the broccoli.

FIG. 2 is an enlarged cross-sectional view taken along line 2—2 of FIG. 1.

FIG. 3 is an enlarged cross-sectional view taken along line 3—3 of FIG. 1.

FIG. 4 is an enlarged cross-sectional view taken along line 4—4 of FIG. 1.

FIG. 5 is a side view in elevation of a portion of the apparatus shown in FIG. 1 according to a second embodiment of this invention.

FIG. 6 is a top plan view of FIG. 3 partially in section and showing a drive means suitable for use in the apparatus of this invention.

FIG. 7 is a side view in elevation of a modification of the embodiment of this invention shown in FIG. 3.

FIG. 8 is a simplified top plan view of FIG. 5, partially in section.

DETAILED DESCRIPTION OF PREFERRED EMBODIMENTS

Referring to FIG. 1, an apparatus 10 for trimming stems of broccoli and then slicing them into longitudinal quarters according to the teaching of this invention is shown. Such apparatus 10 includes a trimming mechanism 11 for removing the lower end of a stem of broccoli and then feeding the broccoli, stem first, into a quartering mechanism 12 according to the teaching of this invention. The trimming mechanism 11 may be driven by an appropriate power source such as the electric motor and shaft 13 shown in FIG. 1 and the quartering mechanism 12 may be driven by the same or a similar power source such as the electric motor and shaft 14 shown in FIG. 1.

The triming mechanism 11 comprises a backing plate 20 with a generally vertically extending major surface and a pair of endless belts 21 and 22 mounted in close spaced opposed relationship to each other and to such major surface. Thus, each of the belts 21 and 22 are mounted for circulation about a pair of pulleys 23, 25 and 24, 26, respectively, which pulleys are mounted for rotation about axes normal to the major surface of the backing plate 20. One of the pulleys 25 of one of the belts 21 may be directly driven in a clockwise direction for example, by the shaft of the motor 13 and one of the pulleys 26 of the other belt 22 may also be driven by the shaft of the motor 13 in a counterclockwise direction through an appropriate pulley and belt arrangment 28. Thus the opposed surfaces of the belts 21 and 22 will move in synchronism with each other in a downward direction as shown in FIG. 1. The surfaces of the belts 21 and 22 are resilient and the opposed portions of such surfaces are spaced from each other sufficiently to enable the stems of stem type vegetables to be firmly gripped therebetween in accordance with the teaching of the prior art. It will be understood that the spacing between the opposed surfaces and the resilience of such surfaces are selected to enable a range of different size stems to be firmly gripped between the belts. Thus, as shown in FIG. 1, the stem portion of a broccoli stalk 30 is placed between belts 21 and 22 with the branch portion 31 of the broccoli stalk 30 projecting from therebetween toward the backing plate 20 and the butt portion 22 of the stem of the broccoli stalk 30 projecting from the opposite side of the opposed surfaces. A rotary knife or saw having fine teeth 34 is mounted adjacent such other side of the opposed surfaces for rotation about an axis normal to the major surface of the backing plate 20 by any appropriate means not shown in FIG. 1.

Thus, the broccoli stalks 30 may be fed by hand between the belts 21 and 22, using the backing plate 20 to position the stalks so that they will be cut to a standard length. The stalks 30 are carried by the belts 21 and 22 into contact with a rotary knife 34 to cut off the butt end 32 of the stem thereof. Such butt ends 32 may be carried away for further processing by an appropriate conveyor means 36.

The cut broccoli stalks 30 drop onto an appropriate downwardly inclined V-shaped chute means 38 upon their release from between the opposed surfaces of the belts 21, 22 by circulation of the belts 21 and 22 about the pulleys 23-26. The V-shaped chute means 38 may be vibrated as by means of an appropriately mounted and driven eccentric device 39 in contact with the chute. It will be understood that as the broccoli stems 30 move along the downwardly inclined chute 38 under the influence of gravity and the vibration imparted to the chute by the eccentric means 39, the stem portions of the broccoli stalks 30 will tend to lead the branch portions 31 thereof since such stem portions are more dense and have less area in contact with the side walls of the chute 28 than the branch portions 31. Thus, the stem portions are heavy and experience less friction and the broccoli stalks 30 will tend to exit from the V-shaped chute 38, stem first, into the quartering mechanism 12 of the apparatus according to this invention.

The quartering section 12 of the apparatus of FIG. 1 also comprises a pair of endless belts 41 and 42, each mounted for circulation about a pair of pulleys 43, 45 and 44,46, respectively. The pulleys 43-46 are mounted for rotation about mutually parallel axes by any appropriate means not shown in FIG. 1 and the pulleys 43-46 are located with respect to each other so that a portion of the surfaces of the belts 41 and 42 are in close spaced mutually opposed relationship to each other during the course of their circulation about the pulleys 43-46.

One of the pulleys 46 of one of the belts 42 may be directly driven in a clockwise direction by the shaft of the motor 14 as shown in FIG. 1. Similarly, one of the pulleys 45 of the other belt 41 may be driven in a counterclockwise direction by the shaft of the motor 14 through an appropriate pulley and belt arrangement 48 as shown in FIG. 1. Thus, the opposed surfaces of the belts 41 and 42 will move in synchronism with each other through the close spaced portion of their travel.

The surfaces of each of the belts 41,42, are resilient and each such surface is divided into two closely spaced parts 51,53 and 52,54, respectively, as best shown in FIG. 2. Thus the belt 41 may comprise an endless section 55 of standard quarter inch thick conveyor belting in contact with pulleys 43,45 and the belt 42 may comprise a similar endless section 56 of standard quarter inch thick conveyor belting in contact with the pulleys 44,46. The exterior surface parts 51, 53 and 52,54 of the sections 55,56 of conveyor belting are made of polyurethane foam. Such parts 51,53 and 52,54, respectively, are spaced from each other on the sections of belting 55,56, respectively, by about one quarter inch and are firmly bonded to the conveyor belting. The polyurethane foam is is of a soft grade and the parts 51,53 52,54 are of generally rectangular cross-section.

In the embodiment of the invention shown in the drawing, the sections of conveyor belting 55,56 are each about twelve inches wide and each of the rectangular surface parts cover about half the width of the belt to a depth of about four inches. As best shown in FIG. 2, the adjacent corners 58 of the four rectangular cross-section surface parts 51-54 are removed in order to facilitate the receipt, positioning and guidance of broccoli stalks 30 therebetween. Thus, as best shown in FIG. 3, the stem of the broccoli stalk 30 will be urged to a central position within the space provided by the removal of the corners 58 of the generally rectangular surface parts 51-54. The branch portion 31 of the broccoli stalk will be gripped by the resilient surface parts 51-54 gently compressing such branch portion 31 as well as the surface parts 51-54. The result will be that the broccoli stalk 30 is firmly but gently gripped between the resilient surface parts 51-54 of the belt with minimum breakage of the branch portion 31 and with the stem centrally located as the stalk 30 is carried along by movement of the composite belts 41 and 42.

Referring again to FIGS. 1 and 2, a slicing knife 60 is positioned in the path of travel of the broccoli stalks 30 as they are carried along by the belts 41 and 42. According to the embodiment of this invention shown in FIGS. 1 and 2, the slicing knife comprises two blades 62 and 64 which intersect each other at right angles. One of the blades 62 extends in the spacing between the belts 41 and 42 and the other of the blades 64 extends in the spacing between the surface parts 51,52 of the belt 41 and the surface parts 52, 54 of the belt 42. The slicing knife 60 is center ground and may be rigidly mounted at the ends of the blade 62 by any appropriate means (not shown in FIG. 1, in order to avoid the confusion with other parts of the apparatus).

Thus, it will be seen that according to this invention, belts 41 and 42 provide a pair of mutually opposed resilient close spaced surfaces on opposite sides of a first given plane. Each of the resilient surfaces of the belts 41 and 42, are divided into two closely spaced parts 51,53 and 52,54, respectively, on opposite sides of a second given plane normal to the first given plane. The resilient surfaces of the belts 41 and 42 are relieved along the second plane on opposite sides of the first plane preferably by providing a substantially flat surface on each of the parts thereof extending at included angles of 45° with respect to such first and second planes. The pulleys 43,45 and 44,46, together with the power source 14 and the pulley and belt arrangement 48 provide means for moving each part 51-54 of the mutually opposed resilient close spaced surfaces synchronously with the other parts thereof along the first and second given planes. The chute 38 provides means for feeding the broccoli stalks between the resilient surfaces of the belts 41 and 42 for movement by the parts 51-54 of such surfaces along a path coinciding with the intersection between the first and second given planes. The knife 60 includes blades 62 and 64, each of which is mounted in one of the first and second given planes in the path of movement of the broccoli stalk by the resilient surfaces of the belts 41 and 42. The knife 60 is mounted so that the center ground cutting edges of the blades 62 and 64 thereof face into and form the leading edge of the knife as the broccoli stalks are moved into contact therewith by the resilient surface parts 51,54 of the belts 41,42.

The stem portions of the stalks of broccoli are fibrous in nature with the fibers running longitudinally thereof. Thus, the stem of a broccoli stalk has a substantial toughness transversely of the stem but is relatively easy to divide longitudinally of the stem. Since the stem of the broccoli stalk 30 encounters the cutting edges of the blades 62,64 of the knife 60 first in an endwise direction, it is relatively easy to cut along the fibers of the stem under the pressure exerted by the gripping action of the parts 51,54 of the resilient surfaces on the branch portion 31 of the broccoli stalk 30. Thus, as shown in FIG. 1, the broccoli stalk 30 will be cut into four substantially equal longitudinal sections or quarters 30' which will be released from between the belts 41,42 as they circulate about the pulleys 45,46. The broccoli sections or quarters 30' may be deposited on a suitable conveyor means 66 for transport to a remote location where they will be subjected to further processing such as cooking or freezing.

Referring to FIG. 4, the belts 21 and 22 of the trimming mechanism 11 of the apparatus of this invention may also be made of endless sections 71 and 72 of standard quarter-inch belting with resilient surfaces 73 and 74, respectively, made of polyurethane foam bonded thereto. However, the resilient surfaces 73 and 74 include divergent portions 75 and 76 at the side thereof adjacent the backing plate 20. Thus, in the trimming mechanism 11, the divergent portions 75 and 76 of the resilient surfaces 73 and 74 accommodate the branch portions 31 of the broccoli stalks 30 whereas the remainder of the resilient surfaces 73, 74 grip the stem of the broccoli stalks 30 with a considerable pressure. This avoids breakage of the branch portion 31 of the broccoli stalks 30 as the stalks 30 are carried into contact with the rotary knife 34 to cut off the the stem butts 32.

From the above it will be understood that the applicant has discovered that if an asymmetric stem type vegetable stalk is gripped between resilient surfaces from four sides, it is possible to grip the stalk with sufficient force to enable slicing thereof into four or more longitudinal sections with minimum breakage of the branch portion of the stalk. This is due in part to the longitudinally fibrous nature of stem type vegetables and in part to the balancing of the forces applied to the branch portion of the stem type vegetable stalk.

Thus, referring to FIGS. 5 through 8, the embodiments of applicants' apparatus are shown in which four pulley type conveying devices are substituted for the belts 41 and 42 of FIG. 1. FIGS. 5 and 6 illustrate an embodiment in which a stem type vegetable stalk is divided into four longitudinal sections and FIGS. 7 and 8 illustrate an embodiment of applicants' apparatus in which a stem type vegetable stalk is divided into eight longitudinal sections.

Referring to FIGS. 5 and 6, it will be seen that a first pair of pulleys 71,73 having a beveled periphery made of polyurethane foam and a second pair of pulleys 72,74 having a beveled periphery of polyurethane foam may be substituted for the belts 41 and 42 including the resilient parts 51-54 of the surface thereof. Thus, as best shown in FIG. 6, the pulleys 71 and 73 provide a first resilient surface on one side of a plane which surface is divided into two parts along a second plane normal to the first plane. The two pulleys 72,74 provide a second resilient surface on the opposite side of the first plane which is divided into two parts along the second plane. As best shown in FIG. 6, the pulleys 71-74 may be driven in synchronism with each other from a common power source 14 through an appropriate gear train indicated by the reference numeral 76.

Thus, as shown in FIG. 6, each of the pulleys 71-74 comprises a rigid central wheel 80 having a polyurethane foam periphery or rim 82. The foam is symmetrically beveled from each side toward the center to provide a narrow flat 84 about the periphery thereof.

The pulleys 71 and 72 are mounted for rotation about parallel axes with their peripheries in close spaced relation. Similarly, the pulleys 73 and 74 are mounted for rotation about parallel axes with their peripheries in close spaced relation. As best shown in FIG. 6, the pulleys 71-74 are all four mounted with their beveled surfaces in close spaced relation. Thus, upon synchronous rotation of the pulleys as indicated by the arrows in FIG. 5, a stalk of broccoli 30 inserted stem first will be carried through the space defined by the resilient surfaces of the pulleys 71-74.

As best shown in FIG. 6, a slicing knife 86 having a pair of mutually perpendicular interacting blades similar to the slicing knife 60 of FIGS. 1 and 2, may be mounted with one of its blades extending in the first plane with the pulleys 71,73 on one side thereof and the pulleys 72,74 on the other side thereof. Similarly, the other blade of the knife 86 may be located in the plane with the pulleys 71,74 on one side thereof and the pulleys 73,72 on the other side thereof. Thus, the apparatus of FIGS. 5 and 6 will divide a stalk of broccoli 30 into four quartes as described in connection with FIGS. 1 through 3. However, as best shown in FIG. 5, the slicing knife 86 need not be located in the plane of the axes of the pulleys 71,74. Instead, each of the blades of the knife 86 may be V-shaped and the knife 86 may be located immediately below the plane of the axes of rotation of the pulleys 71-74.

Referring to FIGS. 7 and 8, an embodiment 90 of this invention suitable for use in dividing a stem type vegetable such as a stalk of broccoli 30 into eight longitudinal sections is shown. According to this embodiment of the invention, each of the two parts of the pair of opposed close spaced resilient surfaces is provided with a groove 94 extending thereinto at an angle of substantially 45° with respect to the first and second planes between the opposed surfaces described hereinabove.

The embodiment 90 of this invention shown in FIGS. 7 and 8 is substantially identical to the embodiment 70 of FIGS. 5 and 6, except that a groove 94 is provided in the resilient rim of the pulleys. Thus, in FIGS. 7 and 8, the reference numerals of FIGS. 5 and 6 have been used to identify like parts. The power source 14 and gear train 76 have been omitted from FIGS. 7 and 8 and the groove 94 which is formed in the flat 84 of the resilient rim 82 is clearly shown.

Also shown in FIGS. 7 and 8, is a four-bladed knife 96 having two of its blades identical to the blades of the knife 86 of FIGS. 5 and 6. The other two blades of the four-bladed knife 96 are positioned to extend within the grooves 94 in the resilient rims 82 of the pulleys 72-74.

According to this embodiment of the invention, it is desirable to mount the knife 96 with its blades extending in the plane defined by the axes of rotation of the pulleys 71-74 as best shown in FIG. 7. This is due to the fact that greater force will be required in splitting the stalk of broccoli 30 into eight sections than that required to split the stalk into four sections. Thus, it is desirable that the broccoli stalk 30 be firmly gripped from all sides as the cutting proceeds in order to minimize damage to the branch portion 31 of the stalk of broccoli 30.

Referring again to FIG. 2, it will be understood that the parts 51-54 of the resilient surfaces of the belts 41 and 42 could be modified to accommodate the four-bladed knife 96 of FIG. 8. In other words, the provision of slots in the resilient foam parts 51-54 at the corners 58 and extending at substantially 45° angles with respect to the blades of the two-bladed knife 60 of FIG. 2, would provide slots in which the other two blades of the knife 96 could be located.

It is believed that those skilled in the art will make the above and other modifications in the specific embodiments of this invention as shown in the drawing without departing from the scope of applicants' invention. In the preferred embodiment of applicants' invention, polurethane foam commercially available under the grade designation A 238 from American Polyurethane, Inc., of Oakland, Calif. was used. However, it is believed that a wide range of soft grade polurethane foams may be used according to the teaching of applicants' invention.

What is claimed is:

1. Apparatus for slicing stem type vegetables such as broccoli and the like into four subtantially equal longitudinal sections defining first second given planes normal to each other, said apparatus comprising:
   (a) a pair of mutually opposed resilient close spaced surfaces on opposite sides of said first given plane, each of said pair of mutually opposed resilient close spaced surfaces being divided into two closely spaced parts on opposite sides of said second given plane, said pair of mutually opposed resilient close spaced surfaces each being relieved along said second plane by providing each of said two parts thereof with a substantially flat surface extending at an included angle of about 45° with respect to said first and second planes;
   (b) means for moving each part of each of said pair of mutually opposed resilient close spaced surfaces synchronously with the other parts of said pair of mutually opposed resilient close spaced surfaces along said given planes, whereby stem type vegetables fed stem first between said pair of mutually opposed resilient close spaced surfaces will be moved by said surfaces along a path coinciding with the intersection between said first and second given planes; and
   (c) knife means mounted in said first and second given planes and in said path of movement of said vegetables with the knife edge of said knife means forming the leading edge thereof with respect to said vegetables.

2. Apparatus as claimed in claim 1 wherein said pair of mutually opposed resilient close spaced surfaces are provided by a pair of conveyor belts each having a soft grade polurethane foam surface on one side thereof divided into said two close spaced parts.

3. Apparatus as claimed in claim 1 wherein each of said mutually opposed resilient close spaced surfaces is provided by a pair of pulley wheels each having a rim made of polyurethane foam, said pair of pulley wheels being mounted for rotation about perpendicular axes with said rims thereof in close spaced relation, each said rim being beveled along said first and second planes from a substantially flat surface located centrally of the periphery thereof.

4. Apparatus as claimed in claim 1 wherein each of said substantially flat surfaces extending at included angles of 45° with respect to said first and second planes has a groove formed therein and extending normally to said flat surface.

5. Apparatus as claimed in claim 4 wherein said knife means comprises two blades with each blade mounted in a different one of said first and second planes and with said blades intersecting each other at the intersection of said first and second planes.

6. Apparatus as claimed in claim 5 wherein said knife means comprises two additional blades each extending in a different pair of said grooves formed in said flat surfaces and intersecting each other at the intersection of said first and second planes.

7. Apparatus as claimed in claim 6 wherein said leading edge of all of said blades of said knife means is positioned substantially centrally between the ends of said path of movement of said stem type vegetables by said mutually opposed close spaced surfaces.

8. Apparatus as claimed in claim 1 wherein means are provided for feeding said stem type vegetables between said pair of mutually opposed resilient close spaced surfaces stem first comprising an inclined V-shape cross-section chute and means for imparting vibrations having a vertical component to said chute.

9. Apparatus for slicing stem type vegetables such as broccoli and the like into four substantially equal longitudinal sections, said apparatus comprising:
   (a) a pair of endless conveyor belts each having its inner major surface mounted for circulation on pulleys with a layer of soft grade polyurethane foam about four inches thick forming the outer major surface thereof, said layer of soft grade polyurethane foam on each of said pair of belts being divided centrally of the transverse dimension of said major surface thereof into two substantially equal close spaced parts, said pair of belts being mounted so that longitudinal portions thereof extend in parallel close spaced relation to each other with the close spaced parts of the layer of foam on one of said pair of belts in alignment with the close spaced parts of the layer of foam on the other of said pair of belts,
   (b) means for circulating said pair of belts so that said longitudinal portions thereof extending in parallel close spaced relation are moved synchronously with each other,
   (c) means for feeding stem type vegetables stem first between said longitudinal portions of said pair of belts extending in parallel close spaced relation to be gripped therebetween and carried thereby through a given path with the stem of said vegetable centered between said belts by said close spaced parts of said layers of foam thereon, and
   (d) knife means mounted in said path through which said vegetables are carried by said longitudinal portion of said pair of belts with the knife edge of said knife means foaming the leading edge thereof with respect to said vegetables, said knife means comprising a first blade extending between said pair of belts and a second blade extending transversely of said belts and between said close spaced parts of said layers of foam thereon.

* * * * *

UNITED STATES PATENT OFFICE
CERTIFICATE OF CORRECTION

Patent No. 4,455,929   Dated June 26, 1984

Inventor(s) KHOSROW GOUDARZI and FERNANDO I. MALTOS

It is certified that error appears in the above-identified patent and that said Letters Patent are hereby corrected as shown below:

Column 1, line 31 - Delete "act" and insert --art--.

Column 2, line 54 - Delete "triming" and insert --trimming--.

Column 2, line 67 - Delete "arrangment" and insert --arrangement--.

Column 4, line 13 - Delete "is" (second occurrence).

Column 6, line 32 - Delete "interacting" and insert --intersecting--.

Column 6, line 41 - Delete "quartes" and insert --quarters--.

Column 7, line 25 - Delete "polurethane" and insert --polyurethane--.

Column 7, line 29 - Delete "polurethane" and insert --polyurethane--.

Column 7, line 34 - after "first" insert --and--.

Column 7, line 63 - Delete "polurethane" and insert --polyurethane--.

Signed and Sealed this

Eighteenth Day of December 1984

[SEAL]

Attest:

Attesting Officer

GERALD J. MOSSINGHOFF

Commissioner of Patents and Trademarks